Dec. 27, 1966     W. MORRISON     3,293,850
THERMAL POWER INSTALLATIONS UTILIZING LIQUEFIED NATURAL GAS
Filed May 5, 1965
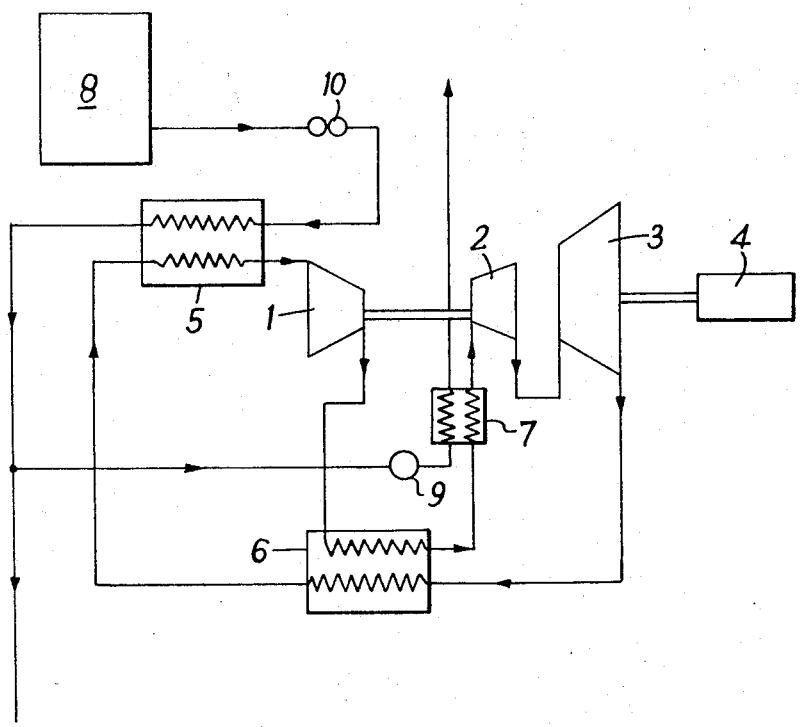
INVENTOR
William Morrison
BY
Kenyon, Palmer, Stewart & Estabrook
ATTORNEYS United States Patent Office 3,293,850
Patented Dec. 27, 1966

3,293,850
THERMAL POWER INSTALLATIONS UTILIZING LIQUEFIED NATURAL GAS
William Morrison, Newcastle-upon-Tyne, England, assignor to International Research & Development Company Limited, Newcastle-upon-Tyne, England
Filed May 5, 1965, Ser. No. 453,317
Claims priority, application Great Britain, May 20, 1964, 20,866/64
5 Claims. (Cl. 60—59)

This invention relates to thermal power installations utilising liquefied natural gas.

The transport of liquefied natural gas from countries with reserves of natural gas to countries without such a supply or in which it is in short supply is taking place on an increasing scale. It is usual to evaporate the liquid gas in the importing country before use.

Various proposals have been made for combining the evaporation of the liquid gas with the generation of mechanical or electrical power in a thermal power plant, the low temperature of the liquid gas being made use of to increase the efficiency of the plant. However, these proposals have involved the necessity of constructing special plant and could not be used with existing thermal power plants. The present invention seeks to make use of the liquefied natural gas in a thermal power plant having a turbine driven compressor which is designed to operate with a gaseous working fluid. Such turbine compressor combinations are well known and are widely used in existing power plants because of their simplicity and efficiency.

In accordance with the present invention the liquefied natural gas is used to cool fluid entering a compressor of a closed cycle gas turbine plant. A portion of the natural gas may subsequently be passed to a combustion chamber, the combustion products of which are used to heat fluid prior to its entry into a turbine of the closed cycle gas turbine plant.

A thermal power installation in accordance with the invention comprises a closed cycle gas turbine plant including a compressor driven by a turbine, a first heat exchanger at the inlet to the compressor, a second heat exchanger at the inlet to the turbine, a combustion chamber and means for circulating a fluid in succession through the first heat exchanger, the compressor, the second heat exchanger, the turbine, and back to the first heat exchanger, means for circulating liquefied natural gas through the first heat exchanger to cool the fluid before it enters the compressor and means for conveying the products of combustion from the combustion chamber through the second heat exchanger to heat fluid entering the turbine.

Preferably the installation includes a third heat exchanger by which heat is transferred from the fluid leaving the turbine to the fluid passing from the compressor to the second heat exchanger. In one embodiment of the invention means are provided for conveying a portion of the natural gas leaving the first heat exchanger to the combustion chamber where it is burned.

The invention also consists in a method of re-gasifying liquefied natural gas and generating mechanical energy comprising pumping the liquefied natural gas to a pressure at least equal to the desired final pressure of the gas, passing the liquefied gas under pressure in indirect heat exchange with a second gas to re-gasify the liquefied gas and cool the second gas and passing the second gas in a closed cycle in which it is subsequently compressed, heated and then expanded in an expansion turbine to produce mechanical energy, without any change of state.

The invention will be described in more detail, with the aid of an example, by reference to the accompanying diagrammatic drawing which shows a thermal power installation in accordance with one form of the invention.

The thermal power installation shown in the drawing comprises a closed cycle gas turbine plant including a compressor 1 driven by a turbine 2. Exhaust gas from the turbine 2 passes to a turbine 3 which is mounted on a separate shaft and is connected to an electric generator 4. A fluid such as helium circulates in a closed circuit which includes a heat exchanger 5 at the inlet to the compressor 1, a heat exchanger 6 at the outlet of the compressor and a heat exchanger 7 at the inlet to the turbine 2.

Fluid entering the compressor is first cooled in the heat exchanger 5 by liquefied natural gas from a reservoir 8. It is then compressed in the compressor 1 and enters the heat exchanger 6 where it is heated by the fluid leaving the turbine 3. It then passes to the heat exchanger 7 where it is heated by the combustion products from a combustion chamber 9. It then passes through the turbines 2 and 3 before entering the heat exchanger 6 where it is cooled by the fluid leaving the compressor 1, as already mentioned. After leaving the heat exchanger 7 it passes to the heat exchanger 5 to start the cycle anew.

The liquefied natural gas is compressed, preferably to a pressure at least equal to the desired final pressure of the gas, by pumps 10 before entering the heat exchanger 5, where it is evaporated. A portion of the gas leaving the heat exchanger 5 is used as fuel in the combustion chamber 9. The remainder of the natural gas may enter gas mains and be used for other purposes.

Whilst in the form illustrated and described above, natural gas is used as the fuel in the combustion chamber, this is not essential and other fuels can be used.

The use of a closed cycle gas turbine plant enables liquefied natural gas to be used to cool the temperature of the working medium at the compressor inlet and hence increase the efficiency of the gas turbine plant without the icing problems which arise when trying to reduce the temperature of air entering the compressor in an open cycle gas turbine plant.

I claim:

1. A thermal power installation comprising: a closed cycle gas turbine plant including a compressor driven by a turbine; a first heat exchanger at the inlet to said compressor; a second heat exchanger at the inlet to the turbine; said first heat exchanger, compressor, second heat exchanger, and turbine being connected in sequence in a closed circuit; a moisture-free fluid in a single phase state filling the said circuit; a reservoir of liquefied natural gas; pump means connected to said reservoir and said first heat exchanger to pass liquefied natural gas from said reservoir through said first heat exchanger to cool said fluid before it enters said compressor; a combustion chamber; and means for conveying the products of combustion from said combustion chamber through said second heat exchanger to heat the fluid entering said turbine.

2. A thermal power installation as claimed in claim 1 comprising a third heat exchanger having primary and secondary circuits of which said primary circuit is connected between said turbine and said first heat exchanger and said secondary circuit is connected between said compressor and said second heat exchanger.

3. A thermal power installation as claimed in claim 1 comprising burner means in said combustion chamber and means coupling said first heat exchanger to said burner means for conveying a part of said liquefied natural gas after gasification to said burner means.

4. A method of re-gasifying liquefied natural gas and generating mechanical energy comprising: pumping the liquefied natural gas to a pressure at least equal to the desired final pressure of the gas; passing the liquefied gas under pressure in indirect heat exchange with a second gas to re-gasify the liquefied gas and cool the second gas without change of state of the second gas, said second gas being moisture-free; and passing the second gas in a closed cycle in which it is subsequently compressed, heated and then expanded in an expansion turbine to produce mechanical energy, without any change of state.

5. A method as claimed in claim 4 including the step of heating said second gas by burning the re-gasified natural gas.

References Cited by the Examiner

UNITED STATES PATENTS

| | | | |
|---|---|---|---|
| 1,632,575 | 6/1927 | Abendroth | 60—36 |
| 2,268,270 | 12/1941 | Traupel | 60—59 X |

FOREIGN PATENTS 583,146    12/1946    Great Britain.

EDGAR W. GEOGHEGAN, *Primary Examiner.*